United States Patent [19]

Michaelis et al.

[11] Patent Number: 5,867,599
[45] Date of Patent: Feb. 2, 1999

[54] SCREENINGS OF CONTINUOUS TONE IMAGES UTILIZING PHYSICAL INTERACTIONS OF ADJACENT PIXELS

[75] Inventors: A. John Michaelis, Glen Ellyn; J. Thomas Shively, Hinsdale, both of Ill.

[73] Assignee: R.R. Donnelley & Sons, Lisle, Ill.

[21] Appl. No.: 584,614

[22] Filed: Jan. 11, 1996

[51] Int. Cl.$^6$ .............................. G06K 9/36; G06K 9/46; H04N 1/40

[52] U.S. Cl. ......................... 382/237; 382/254; 382/260; 358/455; 358/456

[58] Field of Search ................................... 358/455, 456, 358/448, 447, 457, 458; 382/237, 254, 260

[56] References Cited

U.S. PATENT DOCUMENTS

| | | | |
|---|---|---|---|
| 4,709,395 | 11/1987 | Fischer et al. | 382/54 |
| 4,939,589 | 7/1990 | Fischer et al. | 358/448 |
| 5,331,430 | 7/1994 | Xie et al. | 358/456 |
| 5,335,089 | 8/1994 | Xie et al. | 358/456 |
| 5,375,191 | 12/1994 | Franz | 395/109 |
| 5,581,371 | 12/1996 | Spaulding et al. | 358/456 |
| 5,625,716 | 4/1997 | Borg | 382/254 |

OTHER PUBLICATIONS

"A Survey of Electronic Techniques for Pictorial Image Reproduction", by J.C. Stoffel, IEEE Transactions on Communications, vol. COM–29, No. 12, (pp. 1898–1925) Dec. 1981.

"Measurement–based evaluation of a printer dot model for halftone algorithm tone correction", by Charles J. Rosenberg, Journal of Electronic Imaging, vol. 2(3), pp. 205–212, Jul. 1993.

"Measurement of printer parameters for model–based halftoning", by Thrasyvoulos N. Pappas, Chen–Koung Dong, and David L. Neuhoff, Journal of Electronic Imaging, vol. 2(3), pp. 193–204, Jul. 1993.

"Image Noise Evaluation", by R. Shaw, Proceedings of the SID, vol. 21/3, 1980.

"An Adaptive Algorithm for Spatial Greyscale," by R.W. Floyd and L. Steinberg, Proceeding of the S.I.D., vol. 17/2, Second Quarter, 1976.

"Screenless printing improves picture quality", by Debora MacKenzie, New Scientist, p. 29, Aug. 22, 1985.

*Primary Examiner*—Thomas D. Lee
*Attorney, Agent, or Firm*—Marshall, O'Toole, Gerstein, Murray & Borun

[57] ABSTRACT

A system for converting continuous tone values to output values controls adjacency effects by implementing a look up table which represents the continuous tone values as addresses in order to provide output patterns to a marking device. The output patterns, when rendered, have substantially the same densities as the corresponding continuous tone values. Alternatively, the look up table may store filter values of a filter which is used to filter the output values produced during conversion of continuous tone values to output values. The filter values are accessed by representing, as addresses, the output values corresponding to input values surrounding the input value undergoing filtering. As another alternative, the look up table may include a predetermined set of look up tables. Output values relating to previously converted continuous tone values neighboring a continuous tone value undergoing conversion are used to select one of the look up tables, and the continuous tone value undergoing conversion is used to address the selected look up table to retrieve an output value to which the continuous tone value undergoing conversion is converted.

35 Claims, 10 Drawing Sheets

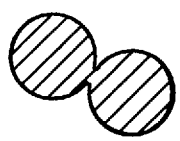
FIGURE 4
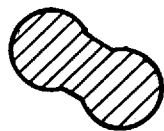
FIGURE 5
20
```
  0   0   1
  1   0   0
  0   0   1
```
FIGURE 6
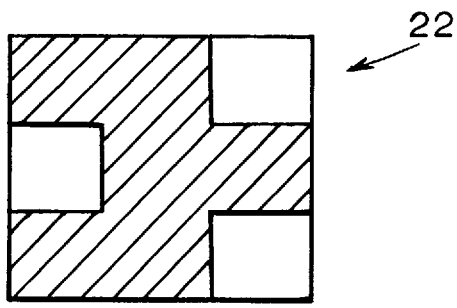
FIGURE 7

```
     X POSITION        X POSITION        X POSITION
    ┌─ ─ ─ ─ ─ ┐      ┌─ ─ ─ ─ ─ ┐      ┌─ ─ ─ ─ ─ ┐
    │ 0  0  1 │      │ 0  0  1 │      │ 0  0  1 │
    ├─ ─┐─ ─ ─┘      ├─ ─┐─ ─ ─┘      └─ ─ ─ ─┐─ ┤
    │ 1 │ 0  0        │ 1 │ 0  0        1  1 │ 1 │
    └─ ─┘              └─ ─┘                  └─ ─┘
     1  1  0           1  1  1           0  1  0
```

FIGURE 18     FIGURE 19     FIGURE 20

SCREENINGS OF CONTINUOUS TONE IMAGES UTILIZING PHYSICAL INTERACTIONS OF ADJACENT PIXELS

TECHNICAL FIELD OF THE INVENTION

The present invention relates to the conversion of input values, which are derived from an original image, into output values, which are to be rendered by a marking device. More particularly, the present invention relates to the conversion of continuous tone values to binary values by using the physical interaction between dots, which are rendered on the basis of the binary values.

BACKGROUND OF THE INVENTION

In lithographic printing systems, an original image to be reproduced is scanned by a scanner on a pixel-by-pixel basis, and the resulting scanned values are used to create one or more printing plates. When a monochrome (e.g., black and white) reproduction is to be printed, a single printing plate is produced. On the other hand, when a color reproduction is to be printed, a set of four plates are typically produced, one for each of the subtractive primary colors of magenta, cyan, and yellow, and one for black. The colored inks reproduce the hues of the original image, and the black ink produces a desired neutral density that cannot be attained by color inks alone. In addition, because black ink is less expensive than color inks, grey replacement (a form of undercolor removal) may be effected to replace quantities of the color inks with black ink. Such a process reduces the cost to produce the reproduction without significantly affecting the appearance thereof.

In traditional prior art lithographic half-tone reproduction systems, each printing plate includes a number of contiguous cells of equal size wherein each cell contains zero, one, or more elementary marks (or "microdots") clustered together to form a single large "dot" in the cell. More recently, systems have been devised wherein microdots are dispersed in a regular pattern in each cell. In other systems, microdots are dispersed in a random pattern on a medium. In each system, the number of elementary marks used to create a clustered dot, or a dispersed dot, depends upon the amount of ink to be applied to the substrate at the cell location. The amount of ink to be applied to the substrate at the cell location is, in turn, dependent upon the scanned value of the original image at a corresponding location thereof.

In the past, dots were formed within cells on a regular spacing or grid using a screen in a photochemical etching process. More recently, half-tone reproduction systems have utilized data processing equipment that electronically produces data representing a half-tone image. This data can be used to plot film or to directly form a printing plate without the use of an actual screen. However, the terms "screen" and "screening" are still used to define the dot pattern produced in a half-tone reproduction. For example, the term "screen ruling" specifies the distance between centers of adjacent cells of the plate. When the cells are all of the same size and regularly spaced, the plate is said to have a "regular screening." In such a case, a cell contains one period of the "screen."

Systems that reproduce half-tone images with regular screening have several drawbacks. For example, resolution is limited by screen ruling. Screen ruling is limited, in turn, by the minimum dot size and spacing that can be reliably and consistently printed. Moreover, regular dot patterns produced by regular screening in color reproduction result in moiré effects and color shifts caused by interference between the superimposed dot patterns. Such undesirable artifacts have been reduced in the past by superimposing the screens at angles with respect to one another. However, this technique is not entirely satisfactory because undesired effects are only minimized, not eliminated completely.

The prior art has reduced the effects of moire and color shifts while at the same time enhancing the quality of the reproduction by eliminating the use of regular screens. Instead, a process known as "screenless" lithography (also referred to as random screening or random dot lithography) has been used to produce irregular dot patterns on the printed page. The use of irregular dot patterns can eliminate visual interference caused by superimposition of the dot patterns, and hence moiré effects are substantially reduced or eliminated.

In one prior art system, a printing plate having an irregular grain structure is photographically exposed and chemically developed in a photolithographic process to produce an irregular dot structure. Such systems, however, cannot create consistent dot patterns from plate to plate.

Random screening has been electronically achieved using, for example, an error diffusion technique, such as the error diffusion technique described by Floyd and Steinberg in their paper "An Adaptive Algorithm for Spatial Greyscale," *Proceeding of the S.I.D.*, Vol. 17/2, Second Quarter, 1976. This paper discloses a reproduction system that compares each continuous tone value, which is sometimes referred to as a contone and which is obtained by scanning an original image, with a threshold to obtain a binary approximation of the continuous tone value. When a continuous tone value is less than the threshold, the continuous tone value is converted to a binary zero. On the other hand, if the continuous tone value is greater than the threshold, the continuous tone value is converted to a binary one. After conversion, the error resulting from the approximation of the continuous tone value is subdivided into error portions, and the error portions are summed in a prescribed pattern with neighboring continuous tone values yet to be converted so that such error is diffused. Each continuous tone value to be converted is thus a combination of its original continuous tone value plus any error portions diffused to it by the conversion of neighboring, previously converted continuous tone values. This process is repeated for each continuous tone value until all continuous tone values resulting from scanning of the original image have been converted to binary values. The result of this conversion of the continuous tone values produced by scanning an original image is typically a bit map. The bit map thus derived is used to produce a reproduction of the original image where the reproduction has dots at locations defined by the binary values in the bit map.

While the foregoing process is effective to reproduce half-tone images with random dots, it has been found that the dots still create artifacts in the reproduction. These artifacts detract from the visual appearance of the reproduction. The conversion system disclosed in Xie, et al. U.S. Pat. No. 5,335,089 assigned to the assignee of the instant application further reduces visible artifacts and perception errors by using a filter in order to remove noise which arises in the conversion process. In this system, a first error is produced by applying the filter (i) to the binary values resulting from the previous conversion of a selected number of continuous tone values which neighbor the continuous tone value undergoing conversion, (ii) to the binary values which result from a predicted conversion of a certain number of continuous tone values which are yet to be converted and which neighbor the continuous tone value undergoing conversion, and (iii) to a binary value having an assumed value of zero for the continuous tone value undergoing conversion. A second error is produced by applying the filter (i) to the binary values resulting from the previous conversion of the selected number of continuous tone values which neighbor the continuous tone value undergoing conversion, (ii) to the binary values which result from the predicted conversion of the certain number of continuous tone values which are yet to be converted and which neighbor the continuous tone value undergoing conversion, and (iii) to a binary value having an assumed value of one for the continuous tone value undergoing conversion. The continuous tone value undergoing conversion is then set to a value of zero if the first error is less than the second error, and to a value of one if the first error is greater than the second error. Each continuous tone value is thus converted to a corresponding binary value which is typically stored in a bit map for rendering by a marking device.

Another electronic system for converting continuous tone values to binary values is described by Stoffel and Moreland in their paper "A Survey Of Electronic Techniques For Pictorial Image Reproduction," *IEEE Transactions on Communications*, Vol. Com-29, No. 12, December 1981. As described in this paper, a continuous tone value is converted to one of seventeen different dot patterns. The particular dot pattern to which the continuous tone value is converted depends upon the magnitude of the continuous tone value. Each of the seventeen dot patterns is confined in a four-by-four cell grid. These dot patterns include a first dot pattern having no marks in the cells, a second dot pattern having a mark in one predetermined cell, a third dot pattern having marks in two predetermined cells, a fourth dot pattern having marks in three predetermined cells, . . . and a seventeenth dot pattern having marks in all sixteen cells. Thus, the dot patterns to which continuous tone values may be converted have only seventeen possible densities. Each continuous tone value produced by scanning an original image is converted to a corresponding dot pattern, and each dot pattern is typically stored as a bit map for rendering by a marking device.

None of these continuous tone value to binary value conversion systems compensate for the tendency of real world marking engines to mark imperfect dots on substrates, such as printing plates, film, and/or paper. That is, the properties of a given marking device, and the properties of a substrate receiving marks from the marking device, can affect the optical density of a bit map rendered on the substrate. For example, the optical density measured on paper when a device has imaged 50 percent of the addressable dots (i.e., half of the dots were made black) may not be half of the optical density of the paper when the same device blackens every point on the paper. Similarly, making 40% of the dots black may yield a density other than 40% of the full black density, and so on.

Such properties, which result in an inequality between the density of the input continuous tone values and the density of the resulting rendered dot structure, are referred to herein as adjacency effects. As one result of adjacency effects, when two marks (i.e., pixels) are placed so that they are adjacent to one other, either horizontally, vertically, or diagonally, they often leave a mark on the media which appears to be larger or smaller than the combined area of the two separate marks. Consequently, two patches marked on a printing media, such that the patches have the same number of marks per unit area, can produce significantly different density measurements when measured with a densitometer. This type of behavior results in a reproduction which is less than a true rendition of an original.

The present invention addresses one or more of the problems described above.

SUMMARY OF THE INVENTION

The present invention is directed to the conversion of input values to output values in such a way as to control adjacency effects. The adjacency effects are controlled so as to best match the density of an input value to an output value or values to which the input value is converted. Furthermore, the adjacency effects are controlled so as to provide output dot patterns having a greater selection of densities to which input values are converted than has been heretofore known in the prior art. The input values may be continuous tone values, the output values may be binary values, and the present invention may be directed to the conversion of continuous tone values to binary values in such a way as to control adjacency effects.

In a specific example of a first implementation of the present invention, a look up table is created which relates continuous tone values to corresponding bit patterns. Each bit pattern has a rendered density which matches its corresponding continuous tone value. In such a system, therefore, an input continuous tone value is used to address the look up table in order to select a bit pattern which, when rendered, produces a density closest to the input continuous tone value.

In a specific example of a second implementation of the present invention, a filter system, such as the system disclosed in the above-mentioned Xie, et al. U.S. Pat. No. 5,335,089, is modified in accordance with the principles of the present invention. The conversion system disclosed in this patent essentially uses two passes during the conversion process. In a first pass, continuous tone values are converted to binary values by comparing the continuous tone values to a threshold, by converting those continuous tone values which are larger than the threshold to ones, and by converting those continuous tone values which are smaller than the threshold to zeros. In a second pass, a filter is applied to the binary values so as to reduce or eliminate any noise introduced during the first pass. According to the second implementation of the present invention, a look up table is used during the second pass in order to select filter values for the filter. A predetermined number of binary values neighboring the current binary value undergoing filtering is used to address the look up table in order to select a filter value for use in the filter which is applied during the second pass. The selected filter value is inserted into the filter, and the final value of the binary value undergoing filtering is produced in accordance with the second pass disclosed in the Xie, et al. patent.

In a specific example of a third implementation of the present invention, one of a predetermined set of look up tables may be selected in accordance with those binary values which correspond to certain previously converted continuous tone values. These previously converted continuous tone values neighbor the continuous tone value currently undergoing conversion. A binary value stored in the selected look up table is addressed in accordance with the continuous tone value undergoing conversion. The continuous tone value currently undergoing conversion is then converted to the addressed binary value.

In view of these examples, and in accordance with one aspect of the present invention, a system for converting input values to output values includes a memory means and a converting means. The memory means stores a look up table. The look up table contains quantities which are useful in converting input values to output values so that the output values have substantially the same densities as the input values and so that adjacency effects are controlled. The converting means is connected to the memory means, and converts the input values to be converted to output values based upon the look up table so that the output values, when rendered, have substantially the same densities as the input values and so that adjacency effects are controlled.

In accordance with another aspect of the present invention, a system for converting continuous tone values to binary values comprises a memory and a converter. The continuous tone values include converted continuous tone values and continuous tone values yet to be converted. The memory stores a look up table. The look up table contains quantities which are useful in converting continuous tone values to binary values so that the binary values, when rendered, have substantially the same densities as the continuous tone values and so that adjacency effects are controlled. The converter is connected to the memory, and converts the continuous tone values yet to be converted to binary values based upon the look up table so that the binary values, when rendered, have substantially the same densities as the continuous tone values and so that adjacency effects are controlled.

In accordance with yet another aspect of the present invention, a method of reducing quantization errors in a marking device comprises the steps of (i) storing a look up table relating input values to corresponding N×M arrays of output values based upon physical dot interaction, dot overlap, and human visual averaging so that the output values in the look up table provide at least (N)(M)+2 density levels when rendered, (ii) converting input values to output values based upon the look up table, and (iii) providing the output values to the marking device.

In accordance with still another aspect of the present invention, a system for reproducing an original comprises a scanning means, a converting means, and a marking means. The scanning means scans the original and produces input values as a result of the scanning. The converting means converts the input values to output values so that adjacency effects are controlled. The marking means marks a substrate in accordance with the output values.

In accordance with a further aspect of the present invention, a system for converting input values to output values comprises a receiving means, a converting means, and a storing means. The receiving means receives input values to be converted. The converting means converts the input values to output values so that adjacency effects are controlled. The storing means stores the output values.

BRIEF DESCRIPTION OF THE DRAWINGS

These and other features and advantages will become more apparent from a detailed consideration of the invention when taken in conjunction with the drawings in which:

FIG. 2 illustrates an example of an input continuous tone value array useful in explaining the present invention;

FIG. 3 illustrates an example of an output binary value array useful in explaining the present invention;

FIG. 4 illustrates the ideal dots resulting from the rendition of two adjacent binary values by a marking device;

FIG. 5 illustrates an example of the real dots resulting from the rendition of two adjacent binary values by a marking device;

FIG. 6 illustrates, in accordance with a first embodiment of the present invention, an example of a 3×3 array of binary values to which a continuous tone value may be converted;

FIG. 7 illustrates an ideal rendition of the 3×3 array of binary values shown in FIG. 6;

FIG. 8 illustrates replication of the 3×3 array of binary values shown in FIG. 6 prior to rendering and density measurement;

FIG. 9 illustrates another example of a 3×3 array of binary values to which a corresponding continuous tone value may be converted;

FIG. 10 illustrates replication of the 3×3 array of binary values shown in FIG. 9 prior to rendering and density measurement;

FIGS. 14 and 15 illustrate examples of two 3×3 arrays of binary values useful in explaining a second embodiment of the present invention;

FIG. 16 illustrates the X locations of binary values which correspond to previously converted continuous tone values neighboring a continuous tone value C undergoing conversion and which are useful in explaining a third embodiment of the present invention;

FIG. 17 illustrates an example of the binary values at the X locations;

FIG. 18 illustrates an example of a 3×3 array of binary values useful in explaining the third embodiment of the present invention;

FIG. 19 illustrates another example of a 3×3 array of binary values useful in explaining the third embodiment of the present invention;

FIG. 20 illustrates still another example of a 3×3 array of binary values useful in explaining the third embodiment of the present invention;

DETAILED DESCRIPTION OF THE PREFERRED EMBODIMENT

Figure 1A:
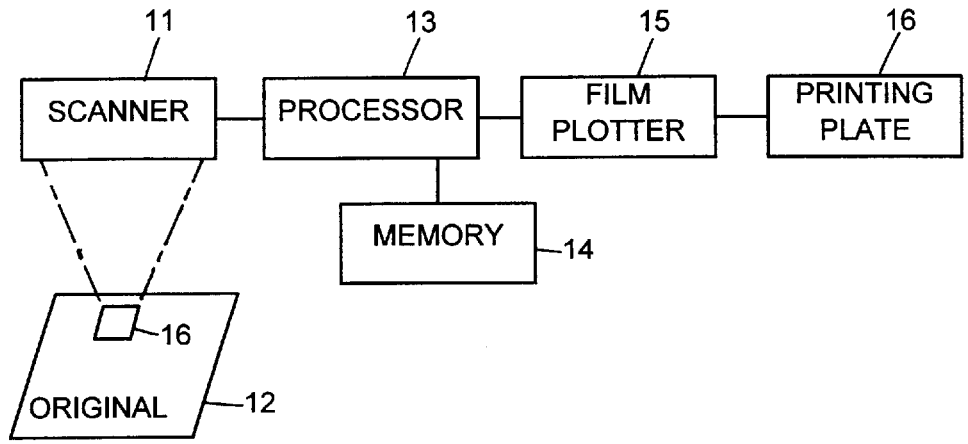
FIGS. 1A, 1B, and 1C comprise block diagrams illustrating three environments in which the present invention may be used.
Figure 1B:
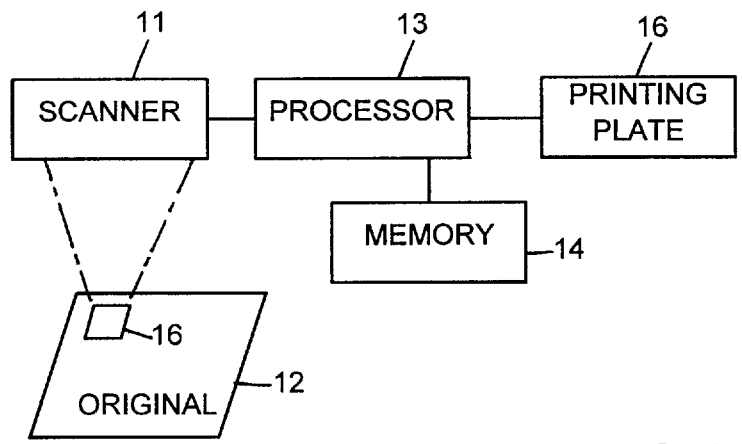

FIGS. 1A and 1B, which are similar to FIGS. 1A and 1B of Xie, et al. U.S. Pat. No. 5,335,089, illustrate two environments in which the present invention may be used. The disclosure of this Xie, et al. patent is incorporated herein by reference. As shown in FIG. 1A, the present invention is particularly useful as part of an image reproduction system 10A. The reproduction system 10A includes a scanner 11 which scans or samples each pixel, such as a pixel 16, of an original 12. Each pixel of the original 12 is converted by the scanner 11 into typically an eight-bit digitized continuous tone value which is supplied to a processor 13 and which is stored in a memory 14. (This eight bit digitized continuous tone value may also be referred to as an input value or as a contone.)

Because eight bits are used, each continuous tone value has an amplitude resolution of 256 different levels which may be supplied by the scanner 11. Thus, the scanner 11 supplies one of 256 possible continuous tone values for each pixel.

The processor 13, which may be in the form of a general purpose computer, converts the continuous tone values into output values which, in a preferred embodiment, have only two levels, and hence are referred to as half-tone binary values or more simply as binary values. These binary values are stored in the memory 14 and are used by a film plotter 15 to plot a film which in turn is used by a block 16 to create a printing plate.

Alternatively, as shown in FIG. 1B, the binary values can be used directly in the formation of printing plates without the necessity of first creating a film.

The printing plate, whether created directly or by film, can then be used in a printer, such as an offset printer, for reproducing the original 12.

Figure 1C:
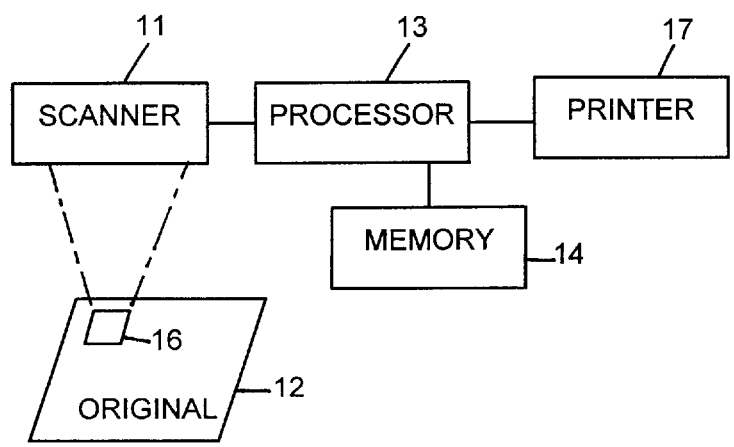

In still other alternatives, the binary values can be used directly by printers such as those used in conjunction with personal computers. For example, as shown in FIG. 1C, the present invention is particularly useful in order to directly control a printer 17. A reproduction system 10C includes the scanner 11 which scans or samples each pixel, such as the pixel 16, of the original 12. Each pixel of the original 12 is converted by the scanner 11 into an eight-bit digitized continuous tone value which is supplied to the processor 13 and which is stored in the memory 14. Each eight-bit digitized continuous tone value is converted by the processor 13 into one or more binary values. All such binary values are stored in the memory 14 and are directly used by the printer 17 to reproduce the original 12.

For ease in understanding the present invention, it is useful to envision the continuous tone values, and the binary values to which the continuous tone values are converted, as being stored in corresponding first and second arrays in the memory 14, although the data need not be physically stored as such. For example, the continuous tone values, which result from scanning the original 12, which are stored in the memory 14, and which are converted to binary values by the processor 13, may be envisioned as shown in FIG. 2. As shown in FIG. 2, the continuous tone values resulting from scanning a first line of the original 12 are stored as a first row of continuous tone values. That is, the first continuous tone value resulting from scanning the first line of the original 12 is stored as a continuous tone value $C_{1,1}$, the second continuous tone value resulting from scanning the first line of the original 12 is stored as a continuous tone value $C_{1,2}$, and so on until scanning of the first line of the original 12 is completed. The continuous tone values resulting from scanning the second line of the original 12 are stored as a second row of continuous tone values. That is, the first continuous tone value resulting from scanning the second line of the original 12 is stored as a continuous tone value $C_{2,1}$, the second continuous tone value resulting from scanning the second line of the original 12 is stored as a continuous tone value $C_{2,2}$, and so on until scanning of the second line of the original 12 is completed. The remaining lines of the original 12 are scanned to similarly fill the remaining rows of the array of continuous tone values shown in FIG. 2.

Similarly, the binary values, which result from the conversion of the continuous tone values shown in FIG. 2, which are stored in the memory 14, and which are supplied as a bit map by the processor 13 to a marking device, may be envisioned as shown in FIG. 3. That is, the first binary value is stored in a first row as a binary value $B_{1,1}$, the second binary value is stored in the first row as a binary value $B_{1,2}$, and so on for the first row. The next binary value is stored in a second row as a binary value $B_{2,1}$, the next binary value is stored in the second row as a binary value $B_{2,2}$, and so on for the second row. The remaining rows of the array of binary values as shown in FIG. 3 contain similar binary values.

It should be noted that, depending upon the implementation of the present invention, there may not necessarily be a one-to-one correspondence between the continuous tone values of the FIG. 2 and the binary values of FIG. 3. It should also be noted that, as is known, the ratio of the size of the original to the size of the reproduction may be controlled as desired. For example, if each continuous tone value is converted to nine corresponding binary values and the size of the reproduction is to be the same as the size of the original, the scanner should be configured to scan at one-ninth output resolution. Known publishing software may be alternatively used to produce the desired ratio.

The location of each binary value in the output bit map provided by the processor 13 is used to determine the location of a dot, and the specific value of the binary value determines whether or not a dot is marked. Whether a binary zero or a binary one results in the marking of a dot depends upon the type of printing to be performed. The array of binary values as a whole, however, defines a pattern of dots to be marked, and this pattern will result in reproduction of the original when printed.

If the original 12 is to be reproduced using only one ink, e.g. black, the processor 13 stores and supplies only one set of binary values such as those shown in FIG. 3. The number of dots in a given area controls the amount of grayness in that area of the reproduced image, and the pattern of dots represents the image of the original. In the event the system is used for color reproduction, the scanner 11 uses color filters to produce three arrays or sets of continuous tone values, one for each of the three primary additive colors red, green and blue. If the three arrays representing the three primary colors are to be translated to four arrays representing the four printing colors of cyan, magenta, yellow and black, the processor 13 will do so. The processor 13 converts each array of continuous tone values to a corresponding array (i.e., bit map) of binary values. The film plotter 15 then uses each array of binary values to plot a separate film for each of the colors to be printed, or each array is used directly to form a separate printing plate for each of the printing colors. During printing, as is well known, each printing plate separately lays down its associated color on the paper or substrate on which the original is being reproduced. Alternatively, each array is used by a printer to lay down a different color on paper or other substrate. The colors are combined by the human visual system to reproduce the colors of the original 12.

As noted above, when a bit map produced by the processor 13 is rendered, an ideal marking device marks dots in accordance with the bit map. FIG. 4 shows an example of two ideal dots marked by a marking device where the dots are, in this case, diagonal dots. In reality, however, the marking device may in fact mark two adjacent diagonal dots as shown in FIG. 5. These real dots have a perceived density unequal to the density of their corresponding continuous tone values. (The density of a continuous tone value is simply the continuous tone value.) Furthermore, the adjacent real dots shown in FIG. 5 have a combined density which is greater than the sum of the densities of the individual ideal marks shown in FIG. 4. The extent of the variation in densities between the ideal dots shown in FIG. 4 and the real dots shown in FIG. 5 is dependent upon the particular marking device used to render the real dots. Furthermore, the accumulative effect of adjacent dots, even if the dots are ideally rendered, may produce a perceived density which is different than the density of the corresponding region of the original image.

Adjacency effects, as referred to herein, include the inequalities between the density of the input continuous tone values and the resulting rendered real dots. As a result of adjacency effects, when two dots (i.e., pixels) are placed so that they are adjacent to one other, either horizontally, vertically, or diagonally, they are often perceived as leaving a dot on the media which is larger (or smaller) than the combined area of the two separate dots.

The present invention is directed toward controlling adjacency effects. In a first embodiment of the present invention, the memory 14 may store a look up table which relates input continuous tone values to output bit patterns such that the output bit patterns, when rendered, have densities which are substantially equal to their corresponding continuous tone values. The bit patterns are stored in the look up table of the memory 14 in a manner dependent upon the particular marking device which is to be used in rendering the binary bit map produced by the processor 13.

When a continuous tone value is to be converted, the continuous tone value is used to address the stored look up table in order to retrieve a corresponding bit pattern, and this retrieved bit pattern is stored in a bit map which is to be provided by the processor 13 to the film plotter 15, directly to the printing plate 16, or directly to the printer 17. In one implementation of the present invention, a zero indicates that a dot is to be rendered at a location corresponding to the position of the zero in the bit pattern, and a one indicates that no dot is to be rendered at a location corresponding to the position of the one in the bit pattern. However, it should be understood that instead of using a zero to indicate that a dot is to be rendered and a one to indicate that no dot is to be rendered, a zero may be used to indicate that no dot is to be rendered and a one may be used to indicate that a dot is to be rendered.

Each bit pattern to which a continuous tone value is to be converted may be arbitrarily comprised of nine bits. The nine bits in each bit pattern may be arranged in a corresponding 3×3 array. When nine bits are used in an array, there are $2^9$ (i.e., 512) possible bit patterns resulting from various combinations of the binary values for these nine bits (i.e., 00000000, 00000001, 00000010, 00000011, . . . 11111111). When the look up table stored in the memory 14 is created, possible bit patterns are rendered by a marking device, and the density of each bit pattern is measured. The densities of the rendered bit patterns and of the possible continuous tone values are compared so that at least some addresses, relating to possible continuous tone values, have stored thereat bit patterns having the closest densities, when rendered, to the densities of the corresponding possible continuous tone values.

One example of a bit pattern 20 in a 3×3 array is shown in FIG. 6. When the bit pattern 20 is rendered by an ideal marking device, a rendered dot pattern 22 results and has the configuration shown in FIG. 7. (The dots are shown as squares for convenience. However, it should be noted that dots are traditionally represented by circles.) A densitometer, which is used to measure the density of the rendered dot pattern 22, produces an output density signal which is the average density of the dots in the rendered dot pattern 22. However, because the rendered dot pattern 22 is typically smaller than the field of view of the measuring densitometer, the densitometer also measures the density of the substrate on which the rendered dot pattern 22 is rendered. Accordingly, error is introduced into the density output of the densitometer. This phenomenon, which introduces such error into the density output of the densitometer, is referred to herein as edge effects.

Edge effects can be eliminated by duplicating the bit pattern 20, as shown in FIG. 8, a number of times. The number of repetitions of the bit pattern 20 is dependent upon the extent of the field of view of the densitometer. That is, the bit pattern 20 should be duplicated enough times so that the duplicated bit pattern, when rendered, extends beyond the field of view of the densitometer. The duplicated bit pattern 20 is then rendered by a marking device and the density of the resulting dot pattern is measured by the densitometer. Accordingly, the densitometer, which is used to measure the density of the rendered dot pattern, averages only the density of the dots and, thereby, eliminates edge effects which might otherwise result if the rendered dot pattern is smaller than the field of view of the densitometer. The bit pattern 20 is stored at addresses in the look up table which represent the continuous tone values having the closest density to the measured density of the rendered dot pattern corresponding to the bit pattern 20. Also, any difference between the density of the rendered bit pattern 20 and the closest continuous tone values may be stored as errors at these addresses.

This process is repeated for other bit patterns. However, not all of the 512 different bit patterns, when duplicated, rendered, and measured, produce uniquely different densities, because the densities resulting from at least some of the 512 bit patterns are the same. For example, a bit pattern 24 as shown in FIG. 9 produces the same density as the bit pattern 20 shown in FIG. 6. This equality of densities may be demonstrated by duplicating the bit pattern 24 as shown in FIG. 10 and by comparing the duplicated bit patterns of FIGS. 8 and 10. If the first line of FIG. 8 is ignored, it can be seen that the duplicated bit patterns of FIGS. 8 and 10 are identical. Accordingly, when a densitometer measures the density of the dot patterns rendered from the duplicated bit patterns of FIGS. 8 and 10, it produces the same average density output signal for each dot pattern.

Figure 11:
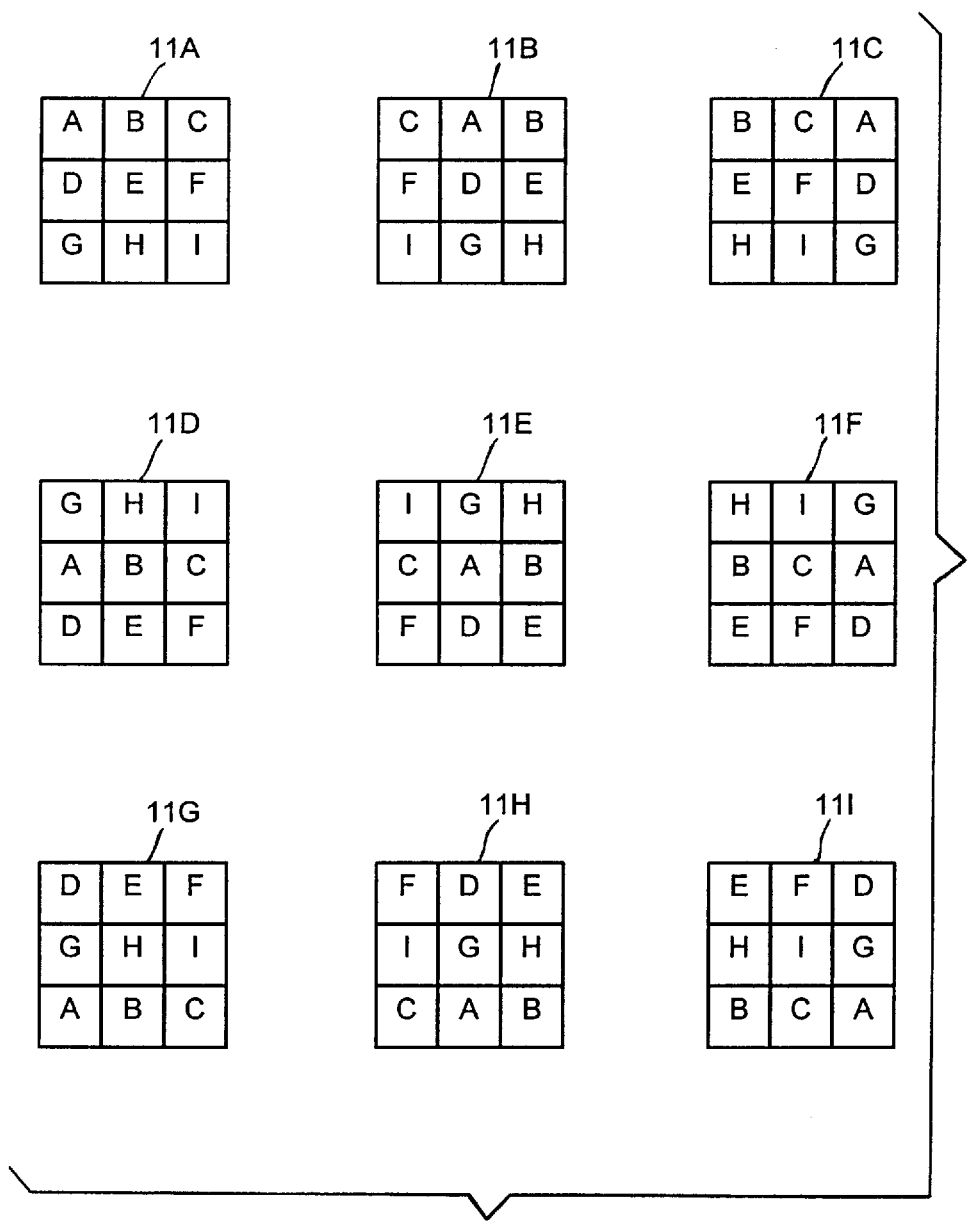
FIG. 11 illustrates arrays useful in explaining the first embodiment of present invention.

When all 512 bit patterns which are possible from a 3×3 array of binary values are duplicated in accordance with FIGS. 8 and 10, and when those bit patterns which produce repetitive densities are eliminated, only up to 64 bit patterns remain. An example of a procedure for determining these 64 different bit patterns without first measuring densities may be explained in connection with FIG. 11. This procedure starts with creating the 512 different bit patterns in sequence. Each of the bits in each of these 3×3 bit patterns occupies a corresponding one of the positions A–I in the array 11A shown in FIG. 11.

Then, as shown by an array 11B, the first bit pattern in this sequence of 512 bit patterns is rotated by moving the first column ADG of the array 11A to the second column of the array 11B, by moving the second column BEH of the array 11A to the last column of the array 11B, and by moving the last column CFI of the array 11A to the first column of the array 11B. The rotated first bit pattern in the array 11B is then compared to the other 511 bit patterns and, if the rotated first bit pattern in the array 11B is identical to any of the other 511 bit patterns, the identical other bit pattern is discarded. It should be noted that there is no need to compare the first bit pattern in the array 11A to the other 511 bit patterns because the first bit pattern in the array 11A is by definition unique.

Next, as shown by an array 11C, the first bit pattern is again rotated by moving the first column CFI of the array 11B to the second column of the array 11C, by moving the second column of the array 11B to the last column of the array 11C, and by moving the last column BEH of the array 11B to the first column of the array 11C. The further rotated bit pattern in the array 11C is then compared to the remaining other bit patterns and, if the rotated first bit pattern in the array 11C is identical to any of the remaining other bit patterns, the identical remaining other bit pattern is discarded.

Then, as shown by an array 11D, the first bit pattern in the array 11A is rotated by moving the first row ABC of the array 11A to the second row of the array 11D, by moving the second row DEF of the array 11A to the last row of the array 11D, and by moving the last row GHI of the array 11A to the first row of the array 11D. This rotated bit pattern in the array 11D is then compared to the remaining other bit patterns and, if this rotated first bit pattern in the array 11D is identical to any of the remaining other bit patterns, the identical remaining other bit pattern is discarded.

Thereafter, the columns of the bit pattern in the array 11D are rotated as shown by the arrays 11E and 11F. In each instance, the bit patterns in the arrays 11E and 11F are compared to the remaining other bit patterns and, if the rotated first bit patterns 11E and 11F are identical to any of the remaining other bit patterns, these identical remaining other bit patterns are discarded.

Then, as shown by an array 11G, the first bit pattern in the array 11D is rotated by moving the first row GHI of the array 11D to the second row of the array 11G, by moving the second row ABC of the array 11D to the last row of the array 11G, and by moving the last row DEF of the array 11D to the first row of the array 11G. This rotated bit pattern in the array 11G is then compared to the remaining other bit patterns and, if the rotated first bit pattern in the array 11G is identical to any of the remaining other bit patterns, the identical remaining other bit pattern is discarded.

Thereafter, the columns of the bit pattern in the array 11G are rotated as shown by the arrays 11H and 11I. In each instance, the bit patterns in the arrays 11H and 11I are compared to the remaining other bit patterns and, if the further rotated first bit patterns in the arrays 11H and 11I are identical to any of the remaining other bit patterns, these identical remaining other bit patterns are discarded.

After the first pattern is completely rotated and all of the other bit patterns matching the bit patterns in the nine arrays 11A–11I of this rotated first bit pattern are eliminated, the next remaining bit pattern in the sequence is similarly rotated to eliminate matching remaining other bit patterns downstream in sequence of the pattern being rotated, and so. When all remaining bit patterns have been rotated and remaining other matching bit patterns have been eliminated, this process is completed and only 64 bit patterns remain.

Figure 12:
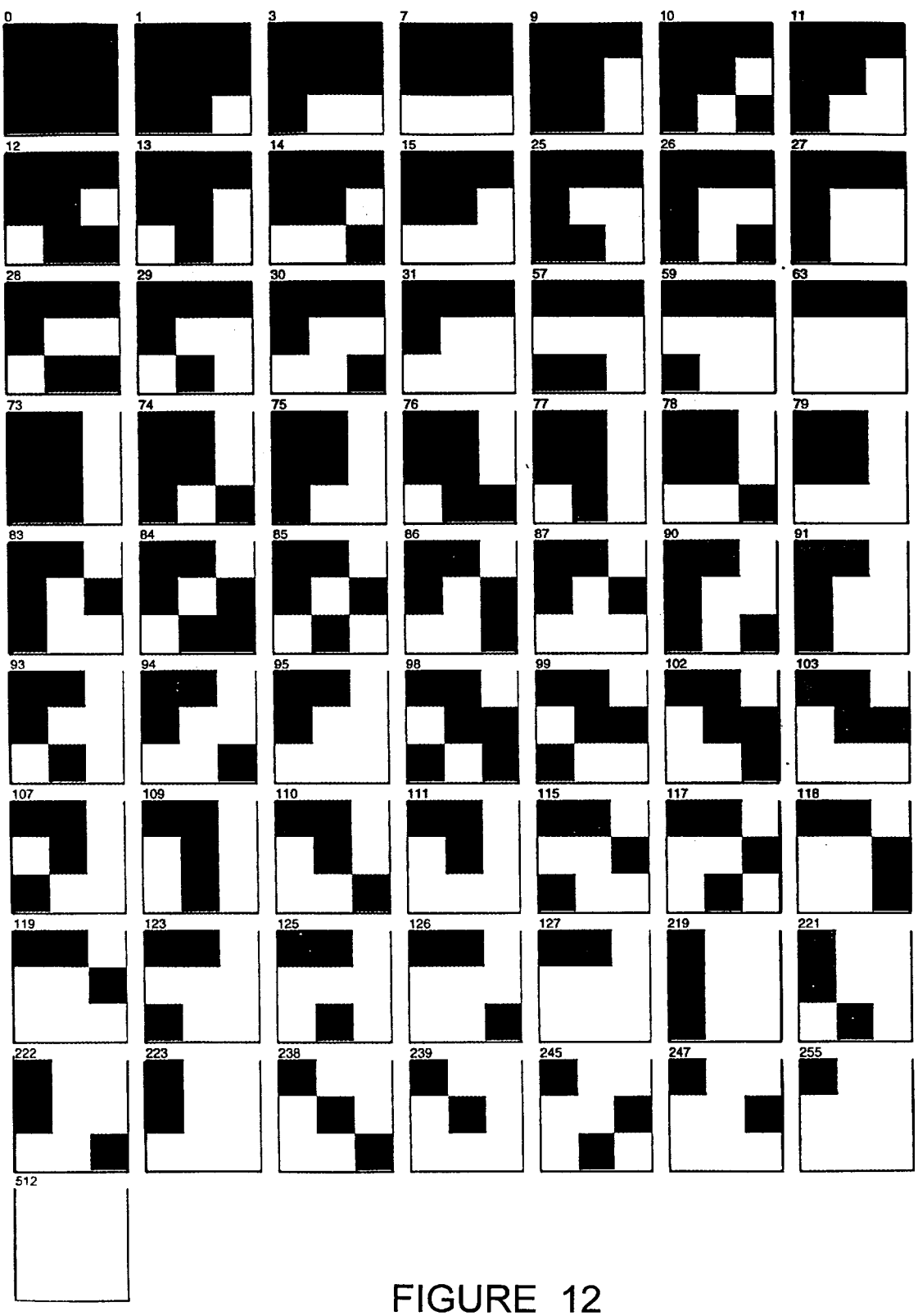
FIG. 12 illustrates, in accordance with the first embodiment of the present invention, enlarged examples of the rendered 3×3 arrays of binary values which may be stored at addresses representing the possible continuous tone values.
Figure 13:
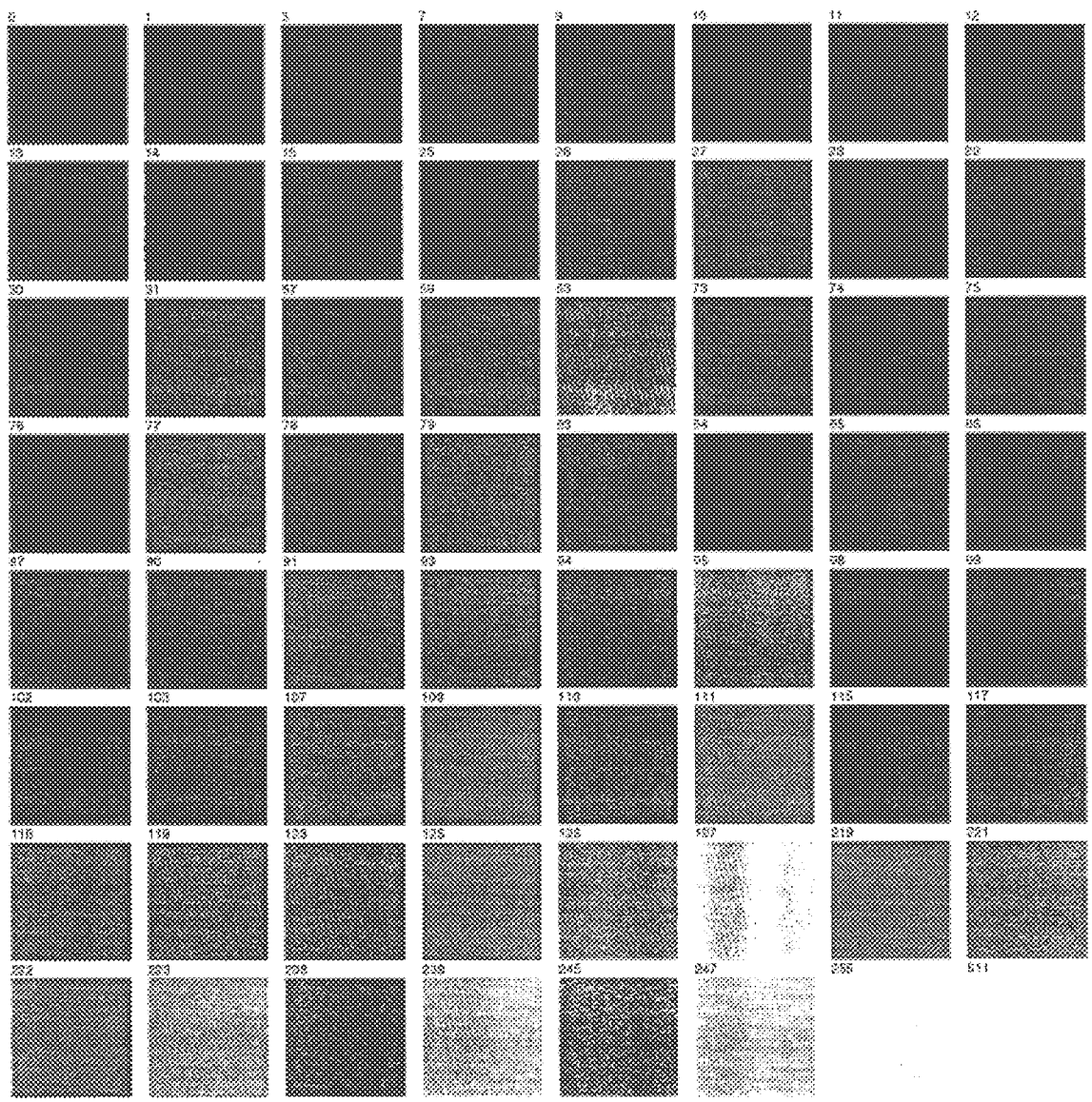
FIG. 13 illustrates the 3×3 arrays of binary values of FIG. 12 after having been rendered at 400 dpi by an actual marking device.

FIG. 12 shows the dot patterns which result from an enlarged rendering of these 64 bit patterns. FIG. 13 illustrates the 64 bit patterns of FIG. 12 after having been rendered at 400 dpi by an actual marking device. Shown in the upper left hand corner of each bit pattern in FIG. 12 is the corresponding bit pattern number of the 64 bit patterns remaining after completion of the rotation process described above. These bit pattern numbers are the decimal number equivalent of the binary number corresponding to the bit patterns. For example, 0 is the decimal number equivalent of the binary number 000 000 000 corresponding to the first of the 64 bit patterns. As another example, 9 is the decimal number equivalent of the binary number 000 001 001 corresponding to the fifth of the 64 bit patterns. It should be noted that, in relation to FIG. 12, a zero is used to designate dot on, and a one is used to designate dot off.

Each possible continuous tone value from 0 to 255 has stored at an address corresponding thereto a corresponding one of these 64 bit patterns. The bit pattern which is stored for a corresponding continuous tone value is the bit pattern which produces a density, when rendered, that is closest to the density of that continuous tone value. That is, the densities of each of the 64 bit patterns is measured by a densitometer. The density of a first of the 256 continuous tone values is then compared to the densities of the 64 bit patterns. The bit pattern whose density is closest to this first continuous tone value is stored at an address in the look up table corresponding to the first continuous tone value. The density of a second of the 256 continuous tone values is then compared to the densities of the 64 bit patterns. The bit pattern whose density is closest to the second continuous tone value is stored at an address in the look up table corresponding to the second continuous tone value. This process is repeated until a bit pattern is stored at an address corresponding to each of the 256 continuous tone values. Also stored at each address is an error representing the difference between the density of a corresponding continuous tone value and the density of the bit pattern stored at the address representing that corresponding continuous tone value.

Because different marking devices can produce different densities when rendering the same bit pattern, the correspondence between bit patterns and the addresses at which the bit patterns are stored depends upon the specific marking device rendering the bit patterns. That is, a bit pattern which is rendered by a first type of marking device may be stored at addresses representing one set of continuous tone values; however, when the same bit pattern is rendered by another type of marking device, the bit pattern may be stored at addresses representing another set of the continuous tone values.

Although each uniquely different density may be produced by more than one bit pattern, as discussed above in connection with FIGS. 8 and 10, only one such bit pattern need be stored at the addresses corresponding to the most closely matching continuous tone values. Alternatively, all such bit patterns producing the same density may be stored at sub-addresses of the addresses corresponding to the most closely matching continuous tone values. Then, when such a continuous tone value is produced by the scanner 11 and is to be converted to binary values, one of the multiple bit patterns stored at the address corresponding to that continuous tone value is accessed, and the accessed bit pattern is then stored in a bit map as the binary values to which that continuous tone value is converted. The next time that this continuous tone value is produced by the scanner 11, another of the bit patterns stored at the address corresponding to this continuous tone value is accessed and stored in the bit map. The selection from among these multiple bit patterns may be effected sequentially, pseudorandomly, randomly, or otherwise.

If a continuous tone value produced by the scanner 11 is to be converted, the processor 13 selects an address of the look up table which corresponds to that continuous tone value produced by the scanner 11. The bit pattern stored at the selected address is saved in the output bit map. The error stored at this address, if any, is diffused as error. When all of the continuous tone values have been similarly converted, and the output bit map is complete, the output bit map may be used to render corresponding dots on a substrate. Alternatively, the bit patterns may be rendered as they are retrieved from the look up table.

As an example of this first embodiment, when the first continuous tone value $C_{1,1}$ of FIG. 2 is to be converted, the continuous tone value of $C_{1,1}$ is used to address the look up table in order to access the 3×3 bit pattern which is stored at this address and which, when rendered, produces a density closest to the density of the continuous tone value $C_{1,1}$. This accessed 3×3 bit pattern is then saved in a bit map for later rendering. For example, this bit pattern may be saved at the locations $B_{1,1}$, $B_{1,2}$, $B_{1,3}$, $B_{2,1}$, $B_{2,2}$, $B_{2,3}$, $B_{3,1}$, $B_{3,2}$, and $B_{3,3}$ shown in FIG. 3. The error stored at this address, if any, is diffused.

The next continuous tone value to be converted is the continuous tone value $C_{1,2}$. The continuous tone value $C_{1,2}$ includes the original scanned value of the corresponding pixel in the original plus any error diffused to this original scanned value because of the conversion of the continuous tone value $C_{1,1}$. When the second continuous tone value $C_{1,2}$ is to be converted, the continuous tone value $C_{1,2}$ is used to address the look up table in order to access the 3×3 bit pattern which is stored at this address and which, when rendered, produces a density closest to the density of the continuous tone value $C_{1,2}$. This accessed 3×3 bit pattern is then saved in the bit map for later rendering. For example, this bit pattern is saved at locations $B_{1,4}$, $B_{1,5}$, $B_{1,6}$, $B_{2,4}$, $B_{2,5}$, $B_{2,6}$, $B_{3,4}$, $B_{3,5}$, and $B_{3,6}$. The error stored at this address, if any, is diffused.

The other continuous tone values are likewise used to address the look up table in order to convert these continuous tone values to corresponding bit patterns and in order to diffuse the appropriate error. When all of the continuous tone values supplied by the scanner 11 from the original 12 have been converted to bit patterns and the bit patterns have been stored as a bit map, the conversion is complete. When 3×3 bit patterns are used, the conversion process according to the first embodiment of the present invention produces nine times as many binary values as there are input continuous tone values.

A second embodiment of the present invention is a filter process and may be implemented as a variation of the method disclosed in the above-referenced Xie, et al. U.S. Pat. No. 5,335,089. As disclosed in that patent, a filter W having seven elements $W_1$–$W_7$ is applied two dimensionally during the conversion process to eliminate or reduce noise caused by converting continuous tone values to binary values. The system disclosed by this patent is essentially a two pass system. In the first pass, the continuous tone values are converted to binary values using thresholding and error diffusion. In the second pass, any noise created by the conversion process of the first pass is reduced or eliminated by filtering the binary values. (It is noted that, as described in this patent, these two passes are somewhat commingled in that not all rows of continuous tone values are converted prior to filtering. That is, some rows of continuous tone values are converted, a row of binary values is filtered, another row of continuous tone values is converted, another row of binary values is filtered, still another row of continuous tone values is converted, still another row of binary values is filtered, and so on.)

In the second embodiment of the present invention, the filter W, which may have a number of filter elements other than seven, and which is employed during the filtering pass, is modified. A look up table is provided containing a plurality of filter values $W_r$ which are accessed in accordance with the binary values corresponding to the continuous tone values in a neighborhood of the continuous tone values undergoing conversion. The accessed filter values $W_r$ are substituted for any one or more of the filter elements of the filter W which is used in each corresponding application of the filter W during the second pass of the system disclosed in the Xie, et al. patent.

Each filter value $W_r$ is stored at a corresponding address in the look up table and is computed dependent upon the following three factors: (i) an ideal density difference $\Delta_i$ between (a) a 3×3 bit pattern where the center value is a one and (b) the same 3×3 bit pattern where the center value is a zero; (ii) a real density difference $\Delta_r$ which is determined as the difference between (a) the measured density of a rendered bit pattern having a one as its center value and (b) the measured density of the same rendered bit pattern having a zero as its center value; and, (iii) at least one ideal filter value $W_i$ which is one of the elements of the filter W used in the second pass of the conversion process taught in U.S. Pat. No. 5,335,089 and which is to be replaced by the real filter value $W_r$.

The process involving these factors (i), (ii), and (iii) results in 256 filter values. These 256 filter values correspond to the 256 bit patterns which result from the various combinations of the outer eight bits in a 3×3 array of binary values. The center value of the 3×3 array is not considered in forming these 256 combinations because this center value corresponds to the continuous tone values undergoing conversion and because the center bit value is set to both zero and one in order to determine $A_r$. That is, a 3×3 array of bits produces 512 bit patterns; however, if the center bit position in the 3×3 array is ignored, then the 3×3 array produces only 256 bit patterns (i.e., ½ of the 512 bit patterns). Accordingly, for each of these 256 3×3 bit patterns, a real filter value $W_r$ is determined according to the three factors described above and is stored in the look up table at an address representing the corresponding 3×3 array.

The ideal density difference $\Delta_i$ may be approximated according to the following equation:

$$\Delta_i = \left( \frac{1}{9} \right)(D_1 - D_0) \qquad (1)$$

where $D_1$ is the density of a rendered 3×3 bit pattern where each bit is set to one, and $D_0$ is the density of a rendered 3×3 bit pattern where each bit is set to zero.

The real density difference $\Delta_r$ is measured for each of the 256 3×3 bit patterns as described above. FIG. 14 shows one possible bit pattern 26 to which a continuous tone value may be converted. The center bit value of the bit pattern 26 is zero. FIG. 15 shows the same bit pattern 26, but with the center value changed to a one. The densities of the two patterns of FIGS. 14 and 15, when duplicated and rendered, are measured by a densitometer. These densities are subtracted in order to produce $\Delta_r$ for the 3×3 array of binary values represented by the eight outer bits of the bit pattern 26.

Alternatively, as discussed above in relation to the first embodiment, many of the possible 512 3×3 bit patterns produce the same density when rendered. In fact, there are only up to 64 of the 512 bit patterns that produce uniquely different densities. Accordingly, one of the 64 bit patterns matches in density the bit pattern 26 shown in FIG. 14, and one of the 64 bit patterns matches in density the bit pattern shown in FIG. 15. Therefore, the density of the one of the 64 bit patterns which matches the bit pattern 26 shown in FIG. 14, and the density of the one of the 64 bit patterns which matches the bit pattern shown in FIG. 15 may be simply subtracted to produce $\Delta_r$ for the 3×3 array of binary values represented by the eight outer bits of the bit pattern 26.

Similarly, $\Delta_r$s may be determined for each of the other 256 bit patterns. For each such possible bit pattern and corresponding $\Delta_r$, a filter value $W_r$ may be computed by the following equation:

$$W_r = \left| W_i \left( \frac{\Delta_r}{\Delta_i} \right) \right| \quad (2)$$

where $W_r$ is the real filter value to be stored in the look up table at an address representing the eight outer bits of the bit pattern, $W_i$ is the ideal filter value of the filter W for which the real filter value $W_r$ is to be substituted, $\Delta_r$ is the measured difference in density between the bit pattern having its center bit set at zero and the same bit pattern having its center bit set at one, and $\Delta_i$ is the ideal density difference as determined in accordance with equation (1). Because the real filter value $W_r$ must be a positive number, equation (2) should be an absolute value function.

Accordingly, for each of these 256 bit patterns, (i) the density difference between the rendered bit pattern where its center bit is set to one and this rendered bit pattern where its center value is set to zero is determined, (ii) the real filter value $W_r$ is computed in accordance with equation (2), and (iii) the computed filter value $W_r$ is stored in a look up table at the address representing the corresponding one of the 256 bit patterns. The result is a look up table in which each of the 256 possible bit patterns has a filter value stored therefor.

When a continuous tone value undergoes conversion, the binary values corresponding to the eight continuous tone values closest to the continuous tone value undergoing conversion are used to address the look up table in order to select the real filter value $W_r$ stored at that address. This filter value is then inserted into the filter, and is processed in accordance with the method, disclosed in the Xie, et al. U.S. Pat. No. 5,335,089. For example, if the continuous tone value $C_{2,2}$ of FIG. 2 is the continuous tone value undergoing conversion, the binary values $B_{1,1}$, $B_{1,2}$, $B_{1,3}$, $B_{2,1}$, $B_{2,3}$, $B_{3,1}$, $B_{3,2}$, and $B_{3,3}$ (which correspond to the eight continuous values $C_{1,1}$, $C_{1,2}$, $C_{1,3}$, $C_{2,1}$, $C_{2,3}$, $C_{3,1}$, $C_{3,2}$, and $C_{3,3}$ closest to the continuous tone value $C_{2,2}$ undergoing conversion and which result from the first pass of the conversion process) are used to address the look up table in order to retrieve one of the filter values $W_r$. This filter value is then inserted into the filter, and is processed in accordance with the method, disclosed in the Xie, et al. U.S. Pat. No. 5,335,089. Accordingly, the processor 11 produces a bit map based upon the continuous tone values supplied by the scanner 11. The conversion process according to the second embodiment of the present invention produces as many binary values as there input continuous tone values.

In a third embodiment of the present invention, a plurality of look up tables are stored in the memory 14 and are used in the conversion process. For example, there may be sixteen look up tables which are selected on the basis of the binary values corresponding to the four previously converted continuous tone values which are closest in neighborhood to the continuous tone value undergoing conversion.

The look up table which is used to convert a continuous tone value C to a binary value is chosen based upon the binary values corresponding to the previously converted continuous tone values which are closest to the continuous tone value C. The binary values corresponding to these closest previously converted continuous tone values are designated by the letter X in FIG. 16 and are referred to as the X position binary values. For example, as depicted in FIG. 16, four binary values corresponding to the four closest previously converted continuous tone values may be used in the third embodiment in order to convert the continuous tone value C to a binary value. If four binary values are used, there are sixteen (i.e., $2^4$) possible combinations of these four binary values so that there will be sixteen look up tables stored in the memory 14. Each look up table corresponds to one of the sixteen bit combinations (i.e., 0000, 0001, 0010, 0011, . . . 1111) of the four binary values depicted at the X locations shown in FIG. 16. FIG. 17 shows an example of one of these sixteen combinations.

In constructing the look up table which corresponds to the neighboring binary values shown in FIG. 17 (i.e., the 0011 look up table), those of the 512 possible bit patterns, which result from the various combinations of the binary values for the nine bits a 3×3 bit array, and which have the same X position binary values (i.e., 0011), are considered. FIGS. 18, 19, and 20 show examples of three 3×3 bit patterns having the same binary values in the X positions as the binary values shown in FIG. 17. All such bit patterns are duplicated and rendered, and the densities of all such rendered bit patterns are measured. Each bit pattern is compared by density to the possible continuous tone values. The center binary value of each bit pattern whose density is closest to that of a corresponding continuous tone value is stored at the address of the 0011 look up table represented by that corresponding continuous tone value.

For example, the center binary value of the bit pattern whose rendered density is closest to the possible continuous tone value $C_0$ (i.e., where $C_0$ is zero) is stored at address zero, the center binary value of the bit pattern whose rendered density is closest to the possible continuous tone value $C_1$ (i.e., where $C_1$ is one) is stored at the address one, the center binary value of the bit pattern whose rendered density is closest to the possible continuous tone value $C_2$ (i.e., where $C_2$ is two) is stored at address two, and so on. Accordingly, a binary value is stored in each address from zero to 255.

In the specific example of FIGS. 17–20, if the rendered density of the bit pattern shown in FIG. 18 matches the possible continuous tone value $C_0$, the center value of the bit pattern shown in FIG. 18 (i.e., zero) is stored at address zero of the 0011 look up table. On the other hand, if the rendered density of the bit pattern shown in FIG. 20 matches the possible continuous tone value $C_0$, the center value of the bit pattern shown in FIG. 20 (i.e., one) is stored at address zero of the 0011 look up table. If the rendered density of the bit pattern shown in FIG. 18 is closest to the possible continuous tone value $C_1$, the center value of the bit pattern shown in FIG. 18 (i.e., zero) is stored at address one of the 0011 look up table. On the other hand, if the rendered density of the bit pattern shown in FIG. 20 is closest to the possible continuous tone value $C_1$, the center value of the bit pattern shown in FIG. 20 (i.e., one) is stored at address one of the 0011 look up table. A binary value is similarly stored for the possible continuous tone values $C_2$–$C_{255}$ at the corresponding remaining 255 addresses of the 0011 look up table.

Thus, because a binary value is stored in each address from zero to 255, and because there are far fewer 3×3 bit patterns having the same binary values as those in the X positions of FIG. 17 than there are possible continuous tone values, the same 3×3 bit patterns may be used to supply center binary values for multiple continuous tone values. As a result, there may be differences between the continuous tone values which are used as addresses into the look up tables and the densities of the rendered bit patterns which are used to supply the center binary values stored at these addresses. The difference, if any, between each continuous tone value which is used to address the look up table and the density of the corresponding rendered bit pattern which is used to supply the binary value stored at that address may be stored as an error at that address. Accordingly, not only will each possible continuous tone value in each look up table have a binary value stored therefor, but each such possible continuous tone value in each look up table will have an error value stored therefor.

Furthermore, there may be instances where, after all bit patterns, which have the same binary values in the X positions as the binary values shown in FIG. 17, have been duplicated and rendered, two or more such duplicated and rendered bit patterns have the same density. If so, and if this density is closest to the densities of more than one continuous tone value, and if the bit patterns which have the same rendered densities and the same X position binary values do not all have the same center bit value, the selection of a zero or a one to be stored for such continuous tone values may be alternated. Alternatively, a one may be stored for such a continuous tone value if that continuous tone value is greater than or equal to a threshold, such as 128, and a zero may be stored for such a continuous tone value if that continuous tone value is less than the threshold. As a still further alternative, the binary value which may be stored for one such continuous tone value may be selected from one of these duplicated and rendered bit patterns, the binary value which may be stored for a next one such continuous tone value may be selected from a next one of these duplicated and rendered bit patterns, and so on. As yet another alternative, these instances may be ignored in that the natural construction of the conversion system is allowed to choose its own binary value for such continuous tone values.

Look up tables corresponding to the others of the sixteen possible X position bit combinations from 0000 to 1111 are similarly constructed and are stored in the memory 14.

When all of the look up tables have been assembled and stored in the memory 14, the processor 11 is then ready to convert each continuous tone value from an original to a corresponding binary value by determining the corresponding X position binary values, by selecting a look up table based upon these X position binary values, by retrieving from the selected look up table the binary value stored at the address of the continuous tone value undergoing conversion, by storing the retrieved binary values in a bit map, and by diffusing the error which is also stored at this address in an appropriate manner.

With reference to FIG. 16, it is noted that the X positions, when used as described above, operate as a sliding window. For example, if continuous tone value $C_{2,2}$ as shown in FIG. 2 is the continuous tone value C undergoing conversion, the X position binary values are the binary values at $B_{1,1}$, $B_{1,2}$, $B_{1,3}$, and $B_{2,1}$ as shown in FIG. 3. The particular binary values at $B_{1,1}$, $B_{1,2}$, $B_{1,3}$, and $B_{2,1}$ determine the look up table that is used for the conversion of the continuous tone value $C_{2,2}$. The continuous tone value $C_{2,2}$ is then used to address this selected look up table. For example, if the continuous tone value $C_{2,2}$ is 124, the address into the selected look up table is 124. The binary value stored at this address is then inserted in the position $B_{2,2}$ of FIG. 3.

As each continuous tone value is converted, the error stored in the look up table at the address of the converted continuous tone value is then distributed to neighboring continuous tone values not yet converted. In accordance with Floyd and Steinberg, for example, the error stored at the address corresponding to the continuous tone value $C_{2,2}$ is diffused by predetermined percentages to the continuous tone values $C_{2,3}$, $C_{3,1}$, $C_{3,2}$, and $C_{3,3}$ shown in FIG. 2.

Next, when the continuous tone value $C_{2,3}$ of FIG. 2 is to be converted, the binary values at $B_{1,2}$, $B_{1,3}$, $B_{1,4}$, and $B_{2,2}$ are used as the X position binary values in order to select the look up table for converting the continuous tone value $C_{2,3}$ to a binary value. The continuous tone value $C_{2,3}$ is used to address this selected look up table. The binary value stored at this address is then inserted into the position $B_{2,3}$ in FIG. 3. The error stored at the address corresponding to the continuous tone value $C_{2,3}$ is diffused. The remaining continuous tone values shown in FIG. 2 are similarly converted to binary values and inserted into the bit map shown in FIG. 3.

Figure 21:
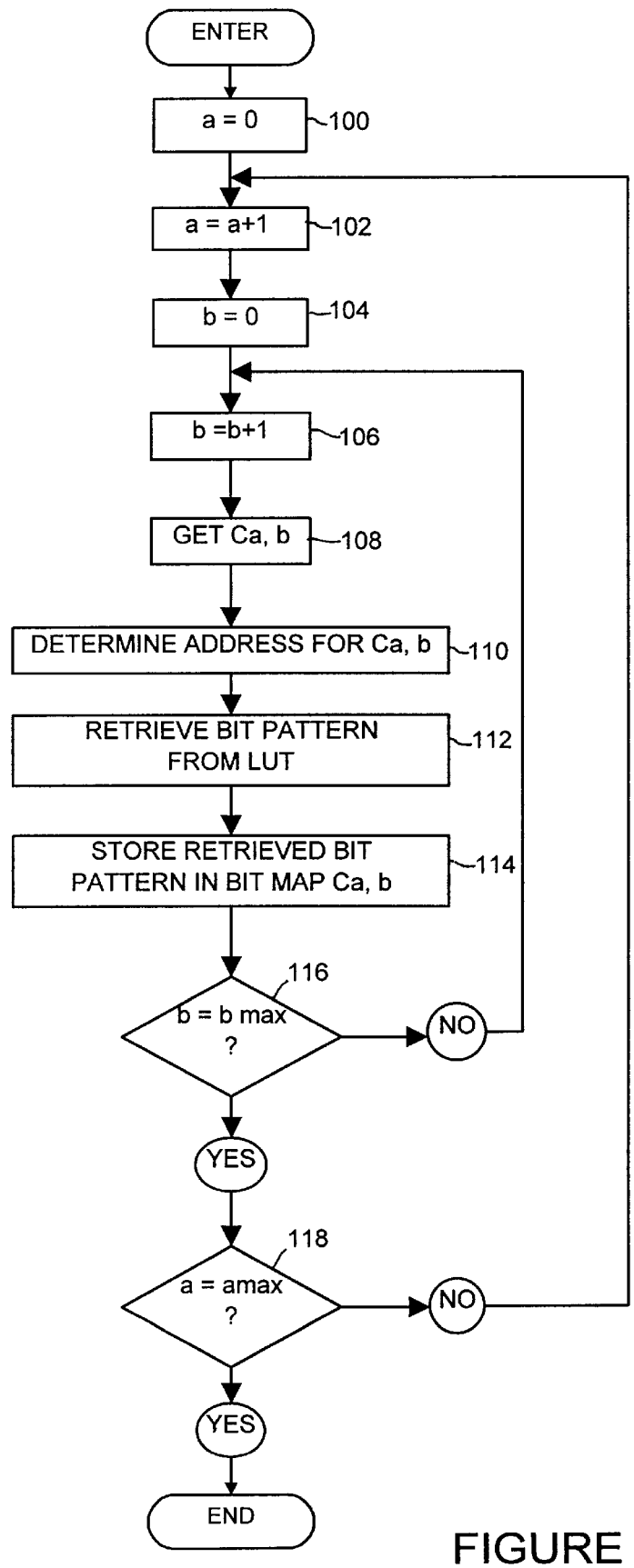
FIG. 21 illustrates a flow chart of a program which may be executed in accordance with the first embodiment of the present invention; and, FIG. 22 illustrates a flow chart of a program which may be executed in accordance with the third embodiment of the present invention.

FIG. 21 shows a flow chart of a program which may be executed by the processor 13 in order to implement the first embodiment of the present invention. As shown in FIG. 21, a block 100 sets a variable a equal to zero, and a block 102 increments the variable a by one. A block 104 sets a variable b equal to zero, and a block 106 increments the variable b by one. A block 108 fetches the continuous tone value $C_{a,b}$ dependent upon the values of the variables a and b. With a=1 and b=1, the continuous tone value $C_{a,b}$ is the continuous tone value at location $C_{1,1}$ as shown, for example, in FIG. 2. A block 110 determines the address in the look up table corresponding to $C_{a,b}$ (i.e., $C_{1,1}$ in this case). A block 112 retrieves a bit pattern from the look up table based upon this address. A block 114 stores the retrieved bit pattern in an output bit map and diffuses error as appropriate.

A block 116 determines whether the variable b has reached $b_{max}$. That is, the block 116 determines whether all of the continuous tone values in the first row have been converted. If the variable b has not reached $b_{max}$, the flow returns to the block 106 where the variable b is incremented by one, and the next continuous tone value $C_{a,b}$ is processed. With a=1 and b=2, the continuous tone value $C_{a,b}$ is the continuous tone value at location $C_{1,2}$. The block 110 determines the address in the look up table corresponding to $C_{1,2}$, the block 112 retrieves a bit pattern from the look up table based upon this address, and the block 114 stores the retrieved bit pattern in the output bit map and diffuses error as appropriate.

When all of the continuous tone values in the first row of continuous tone values are similarly processed (i.e., b equals $b_{max}$), a block 118 determines whether all continuous tone values in all rows have been processed. If not, flow returns to the block 102 where the variable a is incremented by one and the continuous tone values in the next row are converted. When the continuous tone values in all rows and columns have been processed, the flow is ended.

The second embodiment of the present invention may be implemented, for example, by a suitable modification of the flow chart shown in U.S. Pat. No. 5,335,089 by Xie, et al. That is, the block 45 of this patent is modified so that, when the block 45 computes the value u, the block 45 first substitutes the filter value $W_r$, which is stored at the address represented by the eight binary values corresponding to the eight continuous tone values which are closest to the continuous tone value $C_{i,j}$ currently undergoing conversion, for the filter element $W_4$. Then the block 45 operates as disclosed in this patent. Similarly, the blocks 46, 47, and 48 of this patent are also modified to use this filter value $W_r$ in place of the filter element $W_4$.

Figure 22:
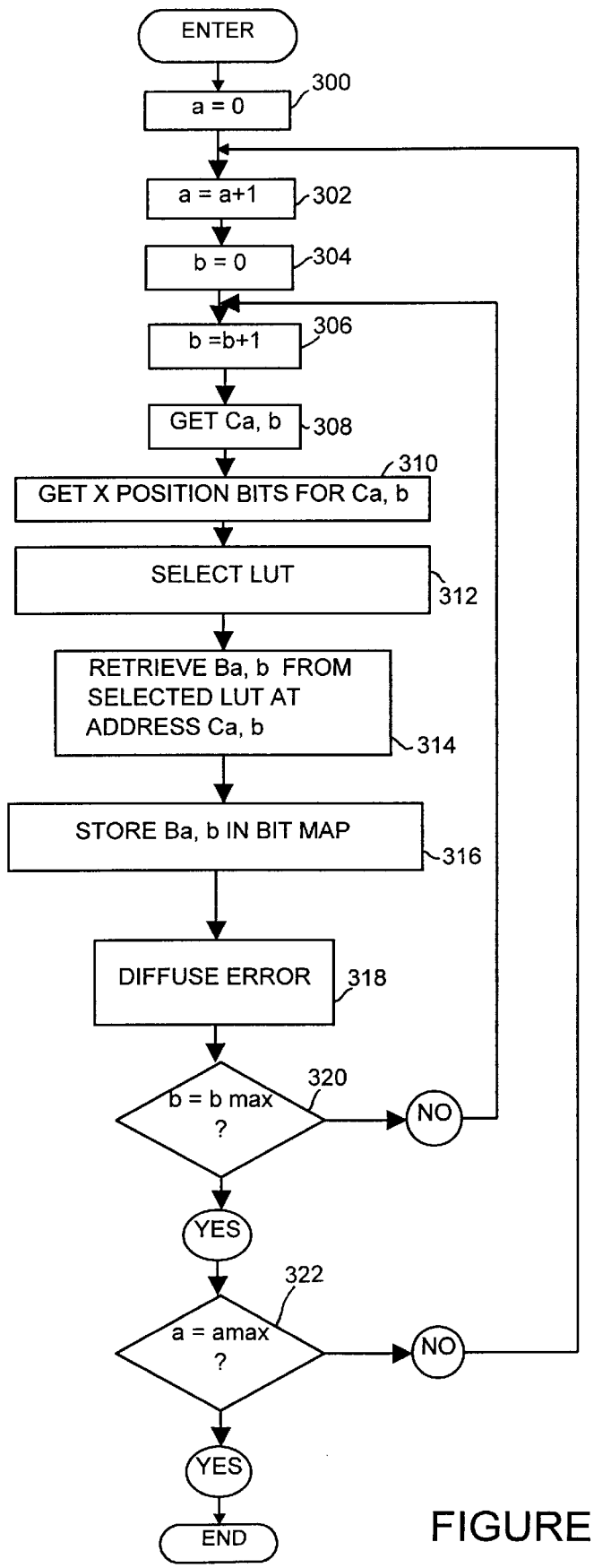

A flow chart for executing the third embodiment of the present invention is shown in FIG. 22. As shown in FIG. 22, a block 300 sets a variable a to zero, and a block 302 increments the variable a by one. A block 304 sets a variable b to zero, and a block 306 increments the variable b by one. A block 308 fetches the continuous tone value $C_{a,b}$, and a block 310 fetches the X position binary values for the continuous tone value $C_{a,b}$.

With a=1 and b=1, the continuous tone value $C_{a,b}$ is the continuous tone value at location $C_{1,1}$ as shown, for example, in FIG. 2. It is noted that, when the continuous tone values in the first row (where b=1) are converted, a full complement of four X position binary values does not exist for these continuous tone values. Such X position binary values may be supplied by duplicating the first row of continuous tone values and by predicting binary values for these duplicated continuous tone values in a manner similar to that disclosed in Xie, et al. U.S. Pat. No. 5,335,089. These X position binary values for the first row of continuous tone values are thus the predicted binary values predicted from the duplicated first row of continuous tone values.

It is also noted that, when the continuous tone values in the first and last columns (where a=1 and a=$a_{max}$) in each row are converted, there are not sufficient X position binary values for these continuous tone values. Such X position binary values may be made sufficient by similarly duplicating the first and last columns of continuous tone values and by predicting binary values for these duplicated continuous tone values.

A block 312 then selects the look up table based upon the X position binary values for the continuous tone value at location $C_{1,1}$. A block 314 retrieves the binary value which is stored in the selected look up table at the address equal to the continuous tone value at location $C_{1,1}$. A block 316 stores this retrieved binary value at location $B_{1,1}$ in a bit map, and a block 318 diffuses the error stored in the look up table at the address which is equal to the continuous tone value at the location $C_{1,1}$.

A block 320 determines whether the variable b has reached $b_{max}$. That is, the block 320 determines whether all of the continuous tone values in the first row have been converted. If the variable b has not reached $b_{max}$, the flow returns to the block 306 where the variable b is incremented by one, and the next continuous tone value $C_{a,b}$ is processed. With a=1 and b=2, the continuous tone value $C_{a,b}$ is the continuous tone value at location $C_{1,2}$. The block 308 fetches the continuous tone value at the location $C_{1,2}$, and the block 310 fetches the X position binary values for this continuous tone value. The block 312 then selects the look up table based upon the X position binary values for the continuous tone value at location $C_{1,2}$. The block 314 retrieves the binary value which is stored in the selected look up table at the address equal to the continuous tone value at location $C_{1,2}$. The block 316 stores this retrieved binary value at location $B_{1,2}$ in the bit map, and the block 318 diffuses the error stored in the look up table at the address which is equal to the continuous tone value at the location $C_{1,2}$.

When all of the continuous tone values in the first row of continuous tone values are similarly processed (i.e., b equals $b_{max}$), a block 322 determines whether all continuous tone values in all rows a have been processed. If not, flow returns to the block 302 where the variable a is incremented by one and the continuous tone values in the next row are converted. When the continuous tone values in all rows and columns have been processed, the flow is ended.

Certain modifications and alterations have been described above. Other modifications and alternations can be made without departing from the scope of the present invention. For example, in the first embodiment of the present invention, the densities of each of the 64 bit patterns is measured by a densitometer. The density of a first of the 256 continuous tone values is then compared to the densities of the 64 bit patterns. The bit pattern whose density is closest to the first continuous tone value is stored at an address in the look up table corresponding to the first continuous tone value. The density of a second of the 256 continuous tone values is likewise compared to the densities of the 64 bit patterns. The bit pattern whose density is closest to the second continuous tone value is stored at an address in the look up table corresponding to the second continuous tone value. This process is repeated until a bit pattern is stored at an address corresponding to each of the possible 256 continuous tone values.

Alternatively, instead of measuring the densities of each of the 64 bit patterns by a densitometer in order to compare the densities of the bit patterns to the densities of the continuous tone values, the densities of each of the 64 bit patterns may be estimated visually in order to visually compare the densities of the bit patterns to the densities of the continuous tone values.

Also, in the first embodiment described above, a bit pattern is stored for each of the 256 possible continuous tone values. Alternatively, the 64 bit patterns may be stored at the closest 64 of the 256 possible continuous tone values. Thus, if a continuous tone value undergoing conversion is not represented by an address in the look up table, then an address representing a continuous tone value which is closest in density to the continuous tone value undergoing conversion is chosen in order to convert that continuous tone value undergoing conversion to a bit pattern. Thus, bit patterns are not stored at every one of the possible continuous tone values from zero to 255. In addition, the difference between the continuous tone value undergoing conversion and the closest continuous tone value, and the error stored at the address representing the closest continuous tone value, may be diffused as error in a predetermined manner, such as the manner suggested by Floyd and Steinberg.

In the third embodiment described above, binary values are stored in a set of look up tables at addresses representing all of the possible continuous tone values. Alternatively, binary values may be stored at addresses corresponding to only those continuous tone values which most closely match the densities of the rendered bit patterns. Thus, if a continuous tone value produced by the scanner 11 does not match an address of the selected look up table, the processor 13 selects an address of the selected look up table which is closest to the continuous tone value produced by the scanner 11. The binary value stored at the selected address is saved in the output bit map. The difference between the selected address and the address representing the continuous tone value produced by the scanner 11 is diffused as error.

Instead of storing, in the memory 14, one look up table in the case of the first and second embodiments, or a single set of look up tables in the case of the third embodiment, which is dependent upon one particular marking device which could be used in rendering the binary bit map produced by the processor 13, a plurality of look up tables or a plurality of sets of look up tables may be stored in the memory 14 each of which is dependent upon a corresponding marking device which could be used in rendering the binary bit map produced by the processor 13. Thus, the processor 13 may be generic to some or all of the possible marking devices which can be used. When a particular marking device is to be used, the correct look up table is simply selected for processing.

Also, as described above, a bit map is not rendered until it is complete. Instead, however, the binary values to which continuous tone values are converted may be rendered as they are produced by the conversion process.

Additionally, although the second embodiment has been described in relation to Xie, et al., U.S. Pat. No. 5,335,089, the second embodiment may be used in connection with other filters and other conversion systems which utilize filters. For example, the second embodiment may be used in conjunction with the conversion system disclosed in Xie, et al., U.S. Pat. No. 5,331,430.

Moreover, although the present invention has been described in terms of converting continuous tone values to binary values, it has applicability to the conversion of input values to output values generally. For example, while many marking devices operate in response to a binary value which has only two possible levels (i.e., zero and one), there are known marking devices which operate in response to output values having more than two levels.

All such modifications and alterations may be made without departing from the scope of the present invention.

What is claimed is:

1. A system for converting input values to output values comprising:

memory means for storing a look up table, wherein the look up table contains quantities useful in converting input values to output values so that the output values have substantially the same densities as the input values and so that adjacency effects are controlled, wherein the quantities are N×M arrays of output values, wherein the look up table stores an N×M array of output values for at least some corresponding possible input values, wherein each N×M array stored in the look up table has a density when rendered, wherein each of the possible input values has a density, wherein the density of each N×M array stored in the look up table, when rendered and adjacent to renderings of the same N×M array, is substantially the same as the density of its corresponding input value, and wherein each N×M array stored in the look up table is arranged to control adjacency effects; and, converting means connected to the memory means for converting the input values to be converted to output values based upon the look up table so that the output values, when rendered, have substantially the same densities as the input values and so that adjacency effects are controlled.

2. The system of claim 1 further comprising error diffusing means responsive to the converting means for diffusing, to a predetermined pattern of input values yet to be converted, errors based upon differences between densities of converted input values and densities of corresponding rendered output values.

3. The system of claim 1 wherein the converting means converts each input value to be converted to an N×M array by representing the input value to be converted as an address into the look up table in order to select an N×M array.

4. The system of claim 3 wherein an N×M array of output values is stored for each possible input value.

5. The system of claim 3 wherein N=M.

6. The system of claim 3 wherein N=M=3.

7. The system of claim 3 further comprising error diffusing means responsive to the converting means for diffusing, to a predetermined pattern of input values yet to be converted, errors based upon differences between densities of converted input values and densities of rendered N×M arrays to which the input values yet to be converted are converted.

8. A system for converting input values to output values comprising:

memory means for storing k look up tables, wherein the k look up tables contain output values useful in converting input values to output values so that the output values have substantially the same densities as the input values and so that adjacency effects are controlled;

converting means connected to the memory means for converting the input values to be converted to output values based upon the look up table so that the output values, when rendered, have substantially the same densities as the input values and so that adjacency effects are controlled;

wherein each of the k look up tables stores at least one output value for a corresponding possible input value, and wherein the converting means selects one look up table based upon X position output values corresponding to input values in a neighborhood of an input value to be converted, and converts the input value to be converted to an output value stored at an address of the selected look up table corresponding to the input value to be converted.

9. The system of claim 8 wherein the output values stored in the k look up tables have densities when rendered, wherein the input values have densities, and wherein the densities of the output values, when rendered, are substantially the same as the densities of the input values so as to control adjacency effects.

10. The system of claim 9 wherein each of the k look up tables contains output values, wherein the output values contained in the k look up tables are supplied from non-X position values of N×M arrays of output values corresponding to each of the k look up tables, wherein the N×M arrays of output values have X positions, wherein the N×M arrays of output values which are used to supply the output values of a corresponding look up table have the same output values in the X positions, wherein the output values in the X positions of the N×M arrays of output values which are used to supply the output values of a corresponding look up table identify the corresponding look up table, and wherein the output values contained in the k look up tables are stored at addresses of corresponding look up tables and are derived from corresponding N×M arrays of output values having rendered densities which are at least close to the input values for which corresponding output values are stored.

11. The system of claim 10 wherein X=4.

12. The system of claim 10 wherein k=16.

13. The system of claim 10 wherein N=M=3.

14. The system of claim 10 further comprising error diffusing means responsive to the converting means for diffusing, to a predetermined pattern of input values yet to be converted, errors based upon differences between densities of converted input values and densities of the output values to which the input values yet to be converted are converted.

15. A system for converting continuous tone values to binary values, wherein the continuous tone values include converted continuous tone values and continuous tone values yet to be converted, the system comprising:

a memory storing a look up table, wherein the look up table contains quantities useful in converting continuous tone values to binary values so that the binary values, when rendered, have substantially the same densities as the continuous tone values and so that adjacency effects are controlled, wherein the quantities are N×M arrays of binary values, wherein the look up table stores an N×M array of binary values for at least some corresponding possible continuous tone value, wherein each N×M array stored in the look up table has a density when rendered, wherein each of the possible continuous tone values has a density, wherein the density of each N×M array stored in the look up table, when rendered and adjacent to renderings of the same N×M array, is substantially the same as the density of its corresponding continuous tone value, and wherein each N×M array stored in the look up table is arranged to control adjacency effects; and, a converter connected to the memory, wherein the converter converts the continuous tone values yet to be converted to binary values based upon the look up table so that the binary values, when rendered, have substantially the same densities as the continuous tone values and so that adjacency effects are controlled.

16. The system of claim 15 further comprising an error diffuser responsive to the converter and arranged to diffuse, to a predetermined pattern of continuous tone values yet to be converted, errors based upon differences between densities of converted continuous tone values and densities of corresponding rendered binary values.

17. The system of claim 15 wherein the converter converts each continuous tone value to be converted to an N×M array by representing the continuous tone value to be converted as an address into the look up table in order to select an N×M array.

18. The system of claim 17 wherein an N×M array of binary values is stored for each possible continuous tone value.

19. The system of claim 17 wherein N=M.

20. The system of claim 17 wherein N=M=3.

21. The system of claim 17 further comprising an error diffuser responsive to the converter and arranged to diffuse, to a predetermined pattern of continuous tone values yet to be converted, errors based upon differences between densities of converted continuous tone values and densities of corresponding rendered binary values.

22. A system for converting continuous tone values to binary values, wherein the continuous tone values include converted continuous tone values and continuous tone values yet to be converted, the system comprising:

a memory storing k look up tables, wherein the k look up tables contain quantities useful in converting continuous tone values to binary values so that the binary values, when rendered, have substantially the same densities as the continuous tone values and so that adjacency effects are controlled;

a converter connected to the memory, wherein the converter converts the continuous tone values yet to be converted to binary values based upon the k look up tables so that the binary values when rendered, have substantially the same densities as the continuous tone values and so that adjacency effects are controlled;

wherein the quantities are binary values, wherein each of the k look up tables stores at least one binary value for a corresponding possible continuous tone value, and wherein the converter selects one look up table based upon X position binary values corresponding to continuous tone values in a neighborhood of a continuous tone value to be converted, and converts the continuous tone value to be converted to a binary value stored at an address of the selected look up table corresponding to the continuous tone value to be converted.

23. The system of claim 22 wherein the binary values stored in the k look up tables have densities when rendered, wherein the possible continuous tone values have densities, and wherein the densities of the binary values, when rendered, are substantially the same as the densities of the continuous tone values so as to control adjacency effects.

24. The system of claim 23 wherein each of the k look up tables contains binary values, wherein the binary values contained in the k look up tables are supplied from non-X position binary values of N×M arrays of binary values corresponding to each of the k look up tables, wherein the N×M arrays of binary values have X positions, wherein the N×M arrays of binary values which are used to supply the binary values of a corresponding look up table have the same binary values in the X positions, wherein the binary values in the X positions of the N×M arrays of binary values which are used to supply the binary values of a corresponding look up table identify the corresponding look up table, and wherein the binary values contained in the k look up tables are stored at addresses of corresponding look up tables and are derived from corresponding N×M arrays of binary values having rendered densities which are at least close to the input values for which corresponding binary values are stored.

25. The system of claim 24 wherein X=4.

26. The system of claim 24 wherein k=16.

27. The system of claim 24 wherein N=M=3.

28. The system of claim 24 further comprising an error diffuser responsive to the converter and arranged to diffuse, to a predetermined pattern of continuous tone values yet to be converted, errors based upon differences between densities of converted continuous tone values and densities of corresponding rendered binary values.

29. A method of reducing quantization errors in a marking device comprising the following steps:

storing a look up table relating input values to corresponding N×M arrays of output values based upon physical dot interaction, dot overlap, and human visual averaging so that the output values in the look up table provide at least (N)(M)+2 density levels when rendered by the marking device;

converting input values to output values based upon the look up table;

providing the output values to the marking device.

30. The method of claim 29 further comprising the step of diffusing, to a predetermined pattern of input values yet to be converted, errors based upon differences between converted input values and the output values to which they are converted.

31. The method of claim 29 wherein each N×M array stored in the look up table has a density when rendered, wherein each possible input value has a density, and wherein the density of each N×M array stored in the look up table, when rendered, is substantially the same as the density of its corresponding input value.

32. The method of claim 31 wherein the step of converting input values to output values comprises the step of converting each input value to be converted to a corresponding N×M array by representing the input value to be converted as an address into the look up table in order to select a corresponding N×M array.

33. The method of claim 32 wherein N=M.

34. The method of claim 32 wherein N=M=3.

35. The method of claim 32 further comprising the step of diffusing, to a predetermined pattern of input values yet to be converted, errors based upon differences between converted input values and the N×M arrays of output values to which the converted input values are converted.

* * * * *